(12) United States Patent  
Smith et al.

(10) Patent No.: US 8,770,041 B2
(45) Date of Patent: Jul. 8, 2014

(54) ROTATIONAL MEASUREMENT SYSTEM FOR FLUID METERS

(75) Inventors: Robert M. Smith, Erie, PA (US); Jeffrey W. Lantz, Erie, PA (US); James C. Breter, Erie, PA (US)

(73) Assignee: FMC Technologies, Inc., Houston, TX (US)

( * ) Notice: Subject to any disclaimer, the term of this patent is extended or adjusted under 35 U.S.C. 154(b) by 208 days.

(21) Appl. No.: 13/497,489

(22) PCT Filed: Sep. 22, 2010

(86) PCT No.: PCT/US2010/002596
§ 371 (c)(1),
(2), (4) Date: Jun. 5, 2012

(87) PCT Pub. No.: WO2011/037625
PCT Pub. Date: Mar. 31, 2011

(65) Prior Publication Data
US 2012/0240689 A1    Sep. 27, 2012

Related U.S. Application Data

(60) Provisional application No. 61/277,226, filed on Sep. 22, 2009.

(51) Int. Cl.
*G01F 1/56* (2006.01)
(52) U.S. Cl.
USPC ........................................ 73/861.08

(58) Field of Classification Search
USPC ................... 73/861.77, 861.08, 861.87, 273; 324/207.25
See application file for complete search history.

(56) References Cited

U.S. PATENT DOCUMENTS

| | | |
|---|---|---|
| 3,721,483 A | 3/1973 | Schneider |
| 3,949,606 A | 4/1976 | Blancett |
| 4,275,291 A | 6/1981 | Feller |
| 4,377,091 A | 3/1983 | DeCarlo et al. |
| 4,553,433 A | 11/1985 | Hicks |
| 5,271,526 A | 12/1993 | Williams |
| 6,894,484 B2 * | 5/2005 | Takizawa et al. ............ 324/174 |
| 6,945,125 B2 | 9/2005 | Vanderah et al. |
| 7,281,899 B1 | 10/2007 | Bucher et al. |
| 7,557,569 B2 * | 7/2009 | Ono et al. ................ 324/207.25 |

* cited by examiner

Primary Examiner — Jewel V Thompson

(57) ABSTRACT

A fluid meter includes a housing which comprises a cavity that defines a flow bore through which a fluid to be metered is directed, a rotor which is rotatably supported in the cavity and is set into rotation by the fluid flowing through the flow bore, a first magnet which is connected to the rotor, a second magnet which is magnetically coupled to the first magnet, a cap member which is positioned over the first magnet and separates the second magnet from the cavity, and a rotary encoder which is operatively coupled to the second magnet. Rotation of the rotor is magnetically transmitted through the cap member from the first magnet to the second magnet and is detected by the rotary encoder.

23 Claims, 9 Drawing Sheets

ROTATIONAL MEASUREMENT SYSTEM FOR FLUID METERS

BACKGROUND OF THE INVENTION

The present invention relates to fluid flow meters. More particularly, the present invention relates to a fluid flow meter which includes a rotor that is magnetically rather than mechanically linked to a rotational measuring device in order to eliminate potential leak paths between the flow path and the surrounding environment.

In many industries, such as the oil, gas and petrochemical industries, fluid meters are used to accurately measure large amounts of fluid passing through a pipeline in order to facilitate selling or otherwise transferring custody of the fluid. One type of fluid meter commonly used for this purpose is a reciprocating blade positive displacement (PD) meter. Referring to FIG. 1, such meters commonly include a meter housing, a fluid inlet and a fluid outlet. A slotted cylindrical rotor is rotatably mounted in the housing. A cam is fixedly mounted to the housing within the rotor. A number of blades are slidably mounted in the rotor slots and are fitted with cam following bearings. As fluid is pumped through the meter, it impinges on the blades, forcing the rotor to rotate within the housing. As the rotor rotates, the cam causes the blades to reciprocate in and out of the rotor. In some meters the blades on opposite sides of the cam may be fixed to each other, such that they reciprocate as a unit.

In the meter in FIG. 1, a maximum of two of the blades are fully extended at any given time. The space between the housing, the rotor and the two extended blades is the measuring chamber. The space between the housing, the rotor and the inlet and outlet is filled with a block of material which prevents direct fluid flow from the inlet to the outlet, thus forcing all the fluid through the measuring chamber. The cam causes the blades to retract into the rotor as they approach and pass the block.

Because the volume of the measuring chamber is accurately known, a known volume of liquid passes through the meter for every ¼ revolution of the rotor. Thus, the total quantity of liquid passing through the meter can be calculated by accurately measuring the number of revolutions of the rotor.

In some prior art fluid meters the housing may be double walled, with the space between the walls allowed to fill with the process fluid. This arrangement insures that the inner wall is pressure balanced and is not distorted by the pressure. Such distortion can change the volume of the measurement chamber and thus degrade the accuracy of the meter.

Referring to FIGS. 2 and 3, an exemplary prior art reciprocating blade PD meter is shown to include a housing 10 and a cover 12 which is bolted to the housing. A mechanical counter 20 is mounted above the cover. A rotor 14 is rotatably mounted on a central shaft 16 inside the housing. In order to calculate the amount of fluid flowing through the meter, information on the rotation of the rotor 14 must be transmitted to the counter 20. A first set of gears 22 transmits the rotation of the rotor 14 to a secondary shaft 24. The secondary shaft passes through the cover 12, and packing gland 26 is provided between the cover and the secondary shaft. A second set of gears 28 transmits the rotation of the secondary shaft 24 to the mechanical counter 20. The mechanical counter may include an optical encoder.

One disadvantage of such mechanical transmissions is that the penetration of the secondary shaft through the cover creates a potential leak path through which the process fluid or volatile organic compounds (VOC's) may escape to the surrounding environment. Another disadvantage of mechanical transmissions is that they can limit the performance turndown ratio (i.e., the range of flow rates over which the meter gives repeatable results) of the meter.

Many reciprocating blade PD meters can be expensive to manufacture. Because the volume of the measuring chamber is so critical to the accuracy of the meter, the components which define the chamber must be manufactured to very tight tolerances. Also, it is critical to the operation and accuracy of the meter that the proper clearance be maintained between the housing and the tips of the blades when the blades are fully extended. Thus the blade assemblies must be uniform and centered in the rotor to very tight tolerances. For these reasons, many prior art meters are difficult to adjust or service in the field.

Another disadvantage of many prior art reciprocating blade PD meters is that they must be mounted in a particular orientation to avoid "cocking" of the blades within the rotor. Such changes in the blade position or orientation can change the meter factor, requiring recalibration of the meter. This lack of flexibility in mounting orientation can make it more difficult and expensive to design and install the meter. This can also be a problem for truck mounted meters when the truck is not parked on level ground.

SUMMARY OF THE INVENTION

In accordance with the present invention, these and other limitations in the prior art are addressed by providing a fluid meter having a housing which comprises a cavity that defines a flow bore through which a fluid to be metered is directed; a rotor which is rotatably supported in the cavity and is set into rotation by the fluid flowing through the flow bore; a first magnet which is connected to the rotor; a second magnet which is magnetically coupled to the first magnet; a cap member which is positioned over the first magnet and separates the second magnet from the cavity; and a rotary encoder which is operatively coupled to the second magnet. In operation of the fluid meter, rotation of the rotor is magnetically transmitted through the cap member from the first magnet to the second magnet and is detected by the rotary encoder.

In accordance with one embodiment of the invention, the rotary encoder comprises a magnetic rotary encoder. For example, the rotary encoder may comprise an integrated circuit magnetic rotary encoder.

In accordance with another embodiment of the invention, the fluid meter also includes a cover which is secured to the housing over the cavity and which comprises a chamber within which the second magnet and the rotary encoder are positioned. In this embodiment, the chamber may be closed by an explosion proof cap.

In accordance with a yet another embodiment of the invention, the rotor comprises an axially extending annular end portion which is rotatably supported in a bearing that is mounted to the cover. In this embodiment, the first magnet may be connected to the end portion.

In accordance with still another embodiment of the invention, the cover comprises an opening which is connected to the chamber and the cap member is secured to the cover over the opening. In this embodiment, the cap member may comprise a generally tubular configuration and the first magnet may extend through the opening and into the cap member. Also, the second magnet may comprise a generally cylindrical base portion which is positioned coaxially over the cap member and a shaft which extends axially from the base portion towards the rotary encoder. Furthermore, the shaft may be rotatably supported in a bearing which is mounted to a support member that is secured to the cover over the cap member. In addition, the rotary encoder may comprise an integrated circuit magnetic rotary encoder which magnetically detects the rotation of the distal end of the shaft or of a third magnet which is disposed on the distal end of the shaft.

In accordance with another embodiment of the invention, the rotor may comprise a number of blade assemblies, each of which includes two interconnected, diametrically opposite blades. In addition, each blade may be laterally restrained between a first inside surface portion of the housing and a second inside surface portion of the cover and between a first retaining ring which is mounted in the housing radially inwardly of the first inside surface portion and a second retaining ring which is mounted in the cover radially inwardly of the second inside surface portion. Furthermore, plastic wear strips may be mounted to the lateral ends of each of the blades.

In accordance with another embodiment of the invention, the fluid meter also includes a measurement element which is mounted in the cavity on one side of the rotor and a block which is mounted in the cavity on the diametrically opposite side of the rotor. In this embodiment, the measurement element may be adjustably connected to the housing. In addition, the block element may be adjustably connected to the housing.

Thus, the fluid meter of the present invention provides many advantages over the prior art. Since the rotor is magnetically rather than mechanically coupled to the rotary encoder, the pressurized cavity does not need to be penetrated by mechanical transmission elements, thereby eliminating the possibility of fluid leaking out of the meter and into the surrounding environment. In addition, since the rotor blades are laterally restrained, the fluid meter can operate in multiple orientations without affecting the meter factor output of the meter. Furthermore, since the measurement element and the block are adjustably connected to the housing, the meter tolerances can be adjusted during assembly, thereby eliminating the need to maintain relatively restrictive manufacturing tolerances.

These and other objects and advantages of the present invention will be made apparent from the following detailed description, with reference to the accompanying drawings.

DETAILED DESCRIPTION OF THE INVENTION

While the present invention is disclosed herein in the context of an exemplary reciprocating blade positive displacement meter, it should be understood that the invention could also be applied to other types of rotating shaft devices, such as turbine meters and nutating disk meters. Also, as used in this disclosure and the appended claims, the terms "upper", "lower", "over", "under" and similar terms are used merely to describe the position or orientation of various features and components relative to each other. These terms are not intended to limit the position or orientation of any features or components relative to any external reference frame.

Figure 1:
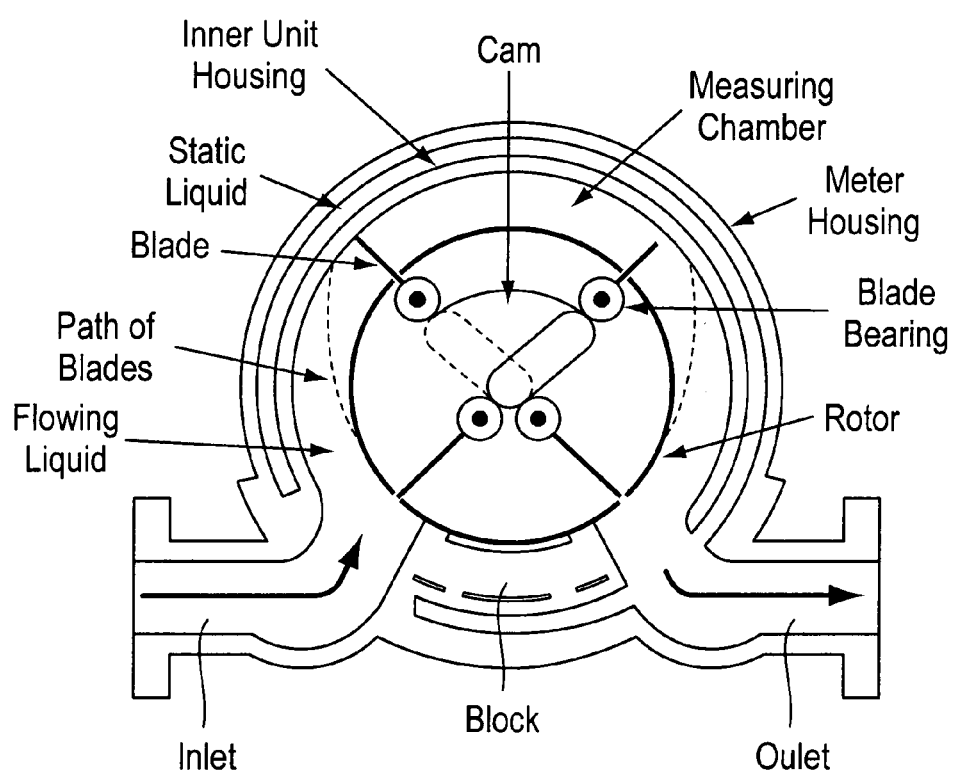
FIG. 1 is a schematic illustration of a prior art reciprocating blade positive displacement meter.
Figure 2:
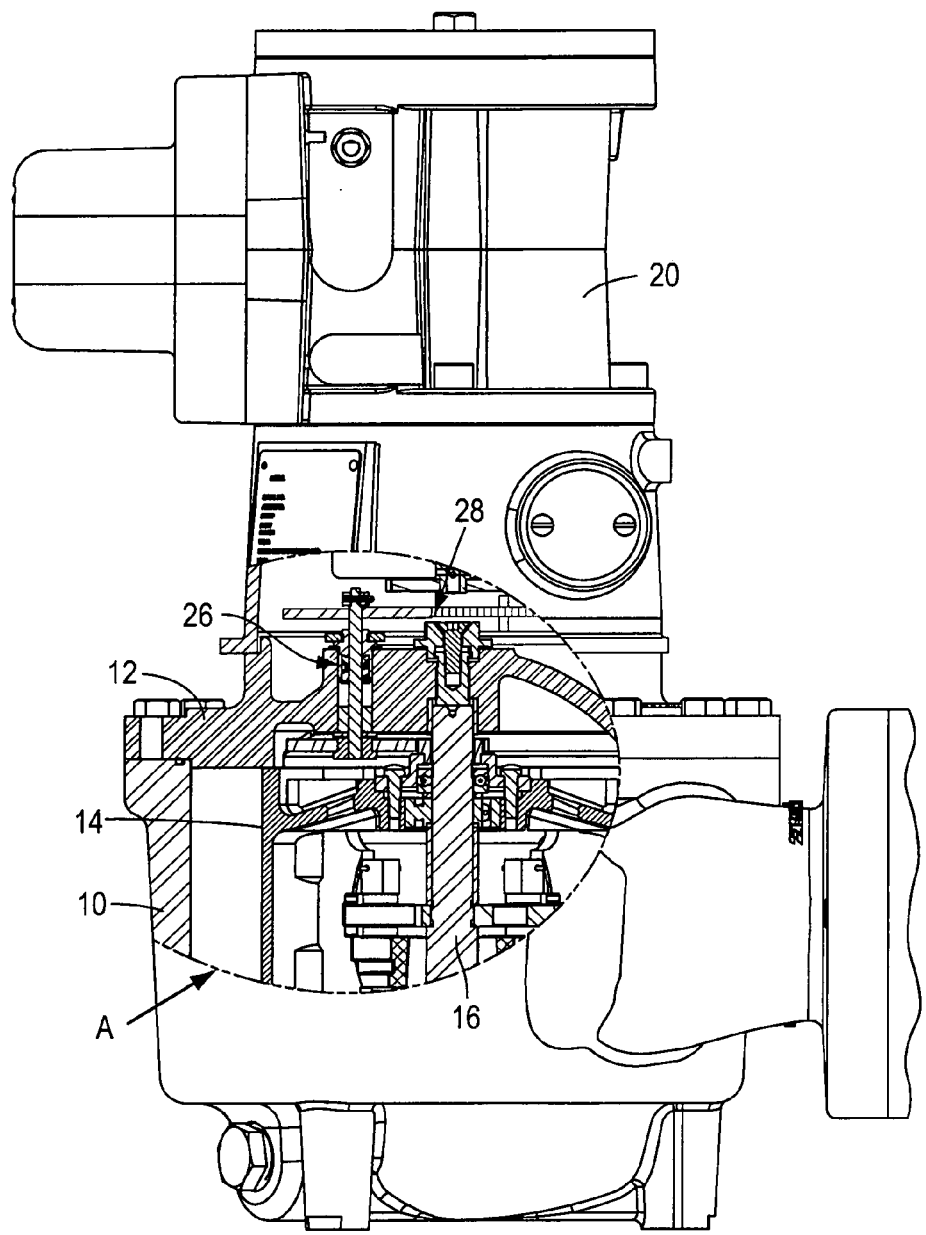
FIG. 2 is a top plan, partial cross sectional view of a prior art reciprocating blade positive displacement meter.
Figure 3:
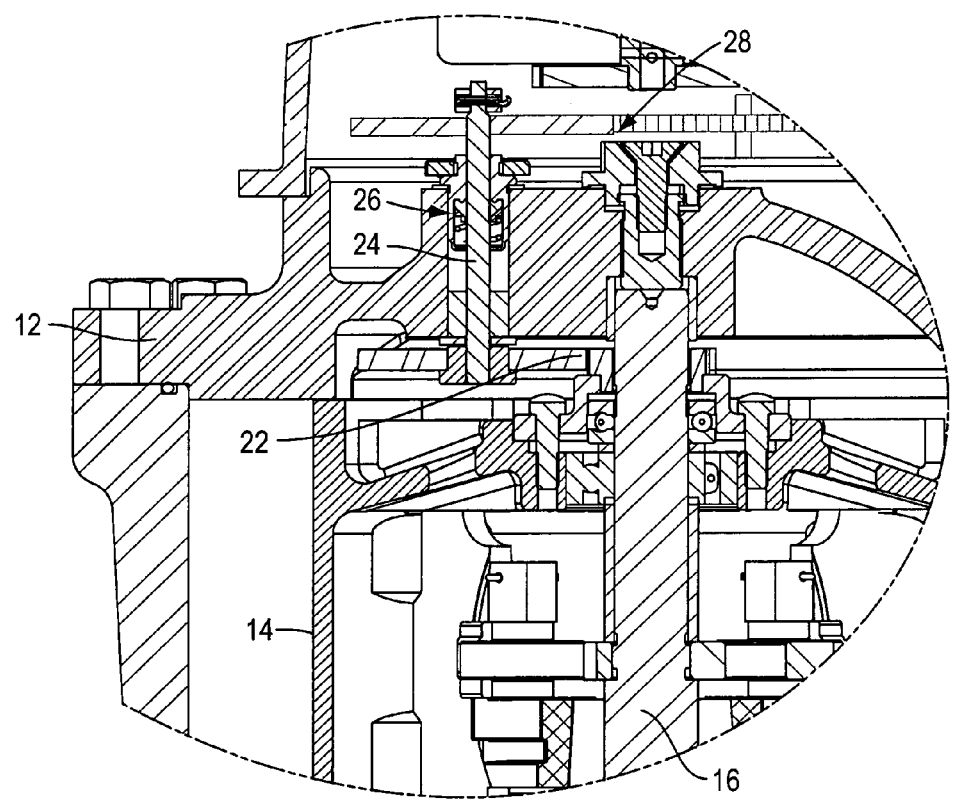
FIG. 3 is an enlarged cross sectional view of the portion of the prior art meter designated "A" in FIG. 2.
Figure 4:
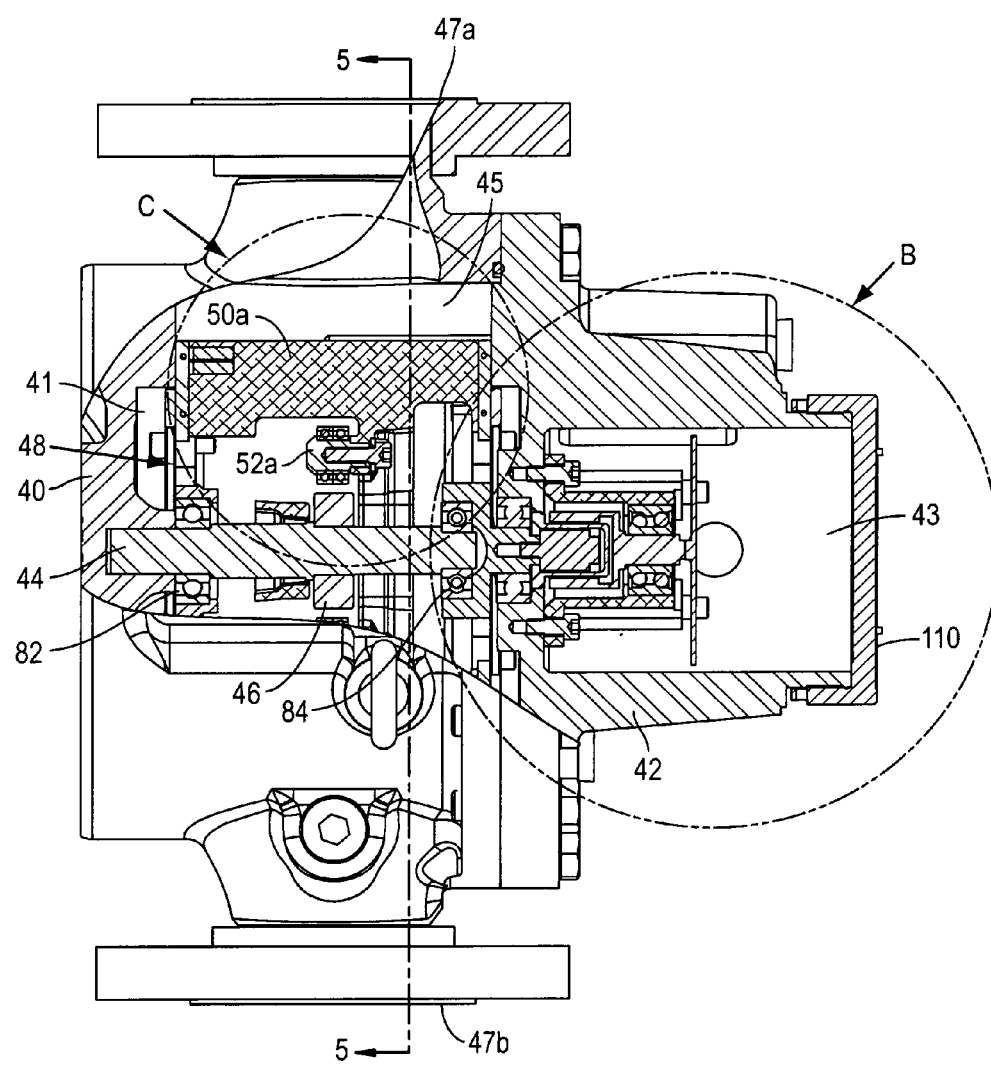
FIG. 4 is a side elevation, partial cross sectional view of an exemplary embodiment of the fluid meter of the present invention.
Figure 5:
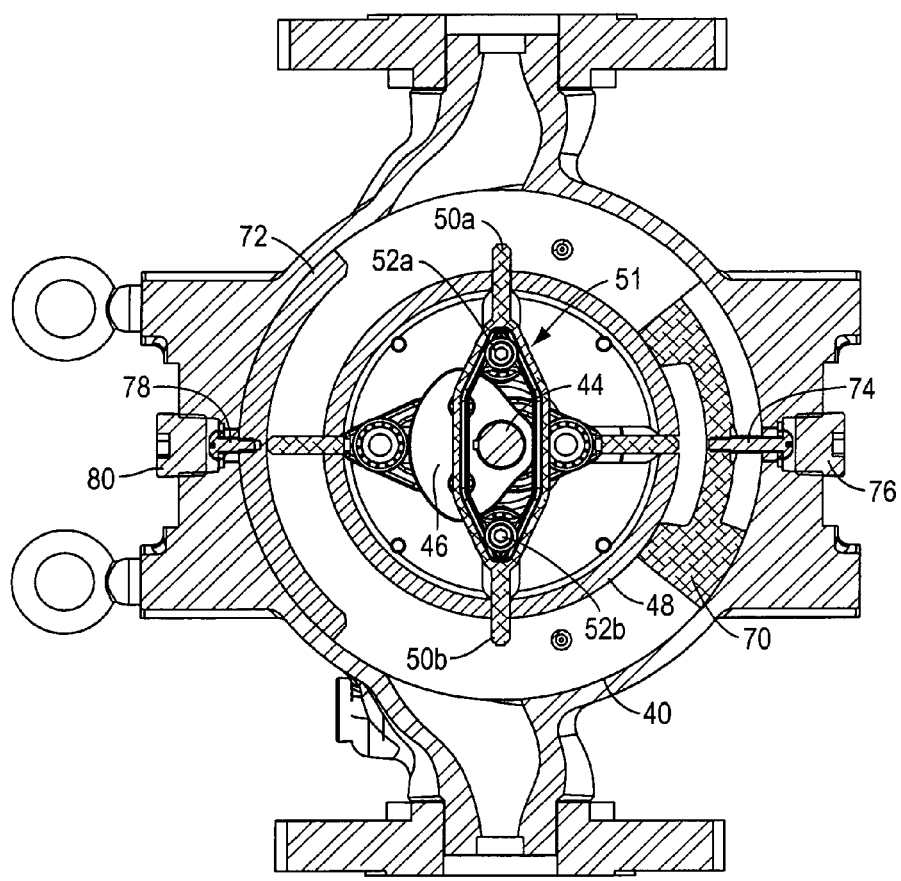
FIG. 5 is a cross sectional view of the fluid meter taken along line 5-5 of FIG. 4.
Figure 6:
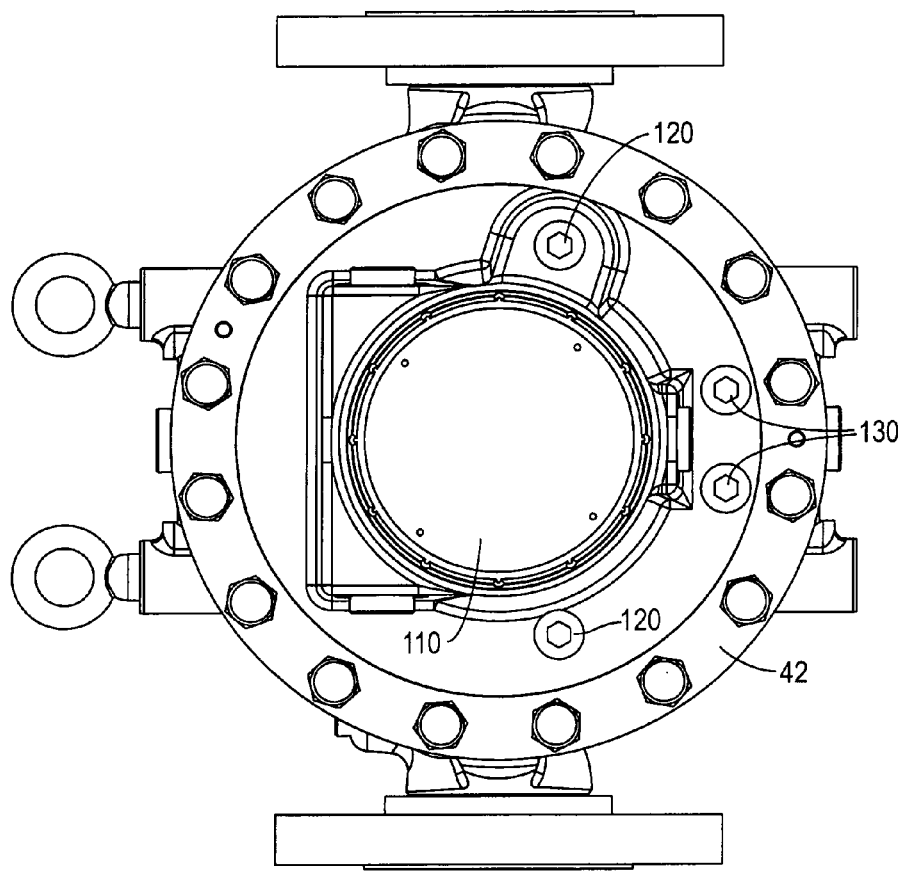
FIG. 6 is a side elevation view of the fluid meter of FIG. 4.

A reciprocating blade positive displacement meter in accordance with an exemplary embodiment of the present invention is shown in FIGS. 4 through 6. The meter includes a housing which comprises an internal cavity 41 over which a cover 42 is bolted. The cavity 41 defines a flow bore 45 through which a fluid to be metered is directed. The fluid enters the flow bore 45 through an inlet 47a and exits the flow bore through an outlet 47b.

Figure 7:
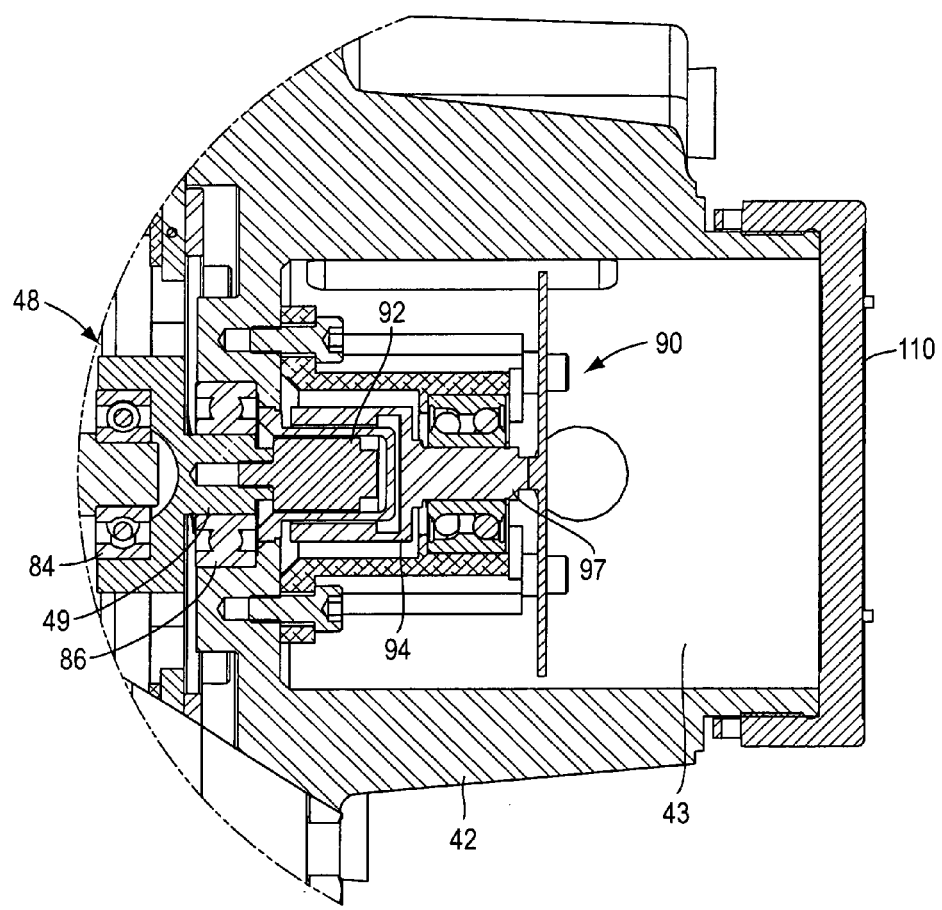
FIG. 7 is an enlarged cross sectional view of the portion of the fluid meter designated "B" in FIG. 4 showing an embodiment of the rotational measurement system of the meter.
Figure 8:
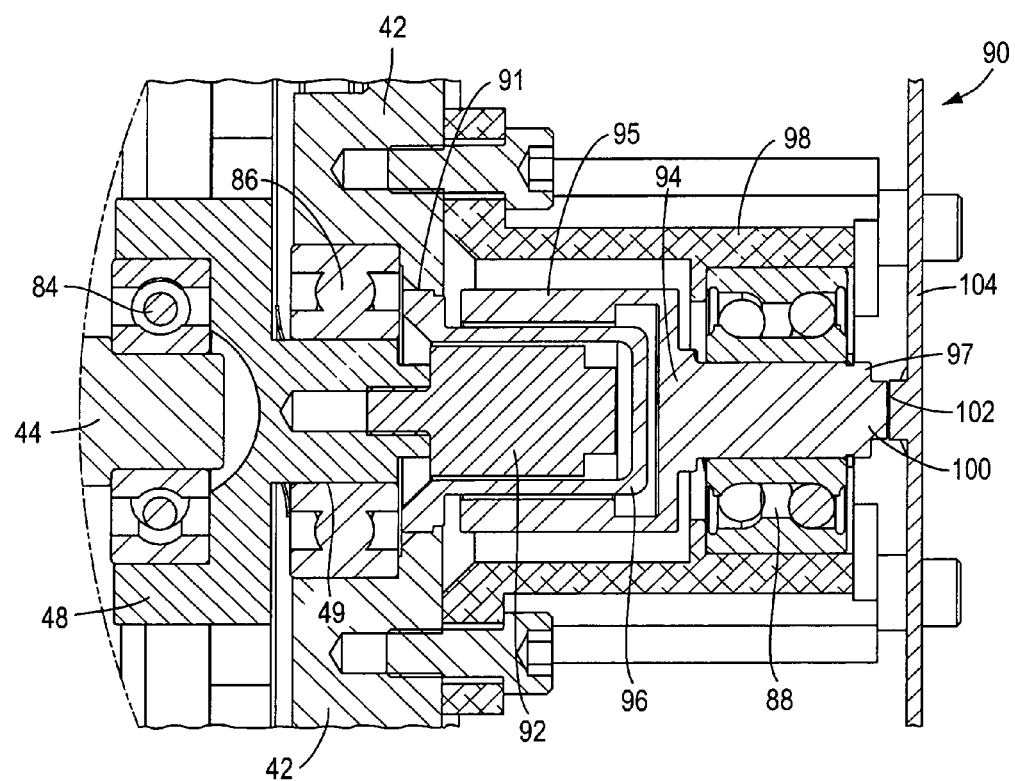
FIG. 8 is an enlarged cross sectional view of the rotational measurement system shown in FIG. 7.
Figure 9:
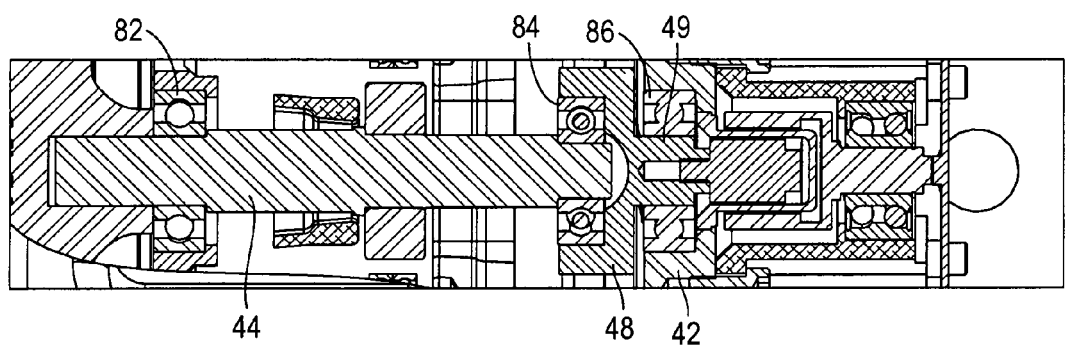
FIG. 9 is an enlarged cross sectional view of a portion of the fluid meter of FIG. 4 showing an embodiment of the bearing support system for the rotor assembly component of the meter.

The meter also includes a shaft 44 which is positioned transversely across the cavity 41 and is secured to the inside of the housing 40. Referring also to FIGS. 7 through 9, a slotted, generally cylindrical rotor assembly 48 is rotatably mounted to the shaft via bearings 82 and 84. The rotor 48 comprises an axially extending annular end portion 49 which is rotatably supported in a bearing 86 that is mounted in the cover 42. The bearings 82, 84 and 86 may be made of any suitable material, such as a ceramic, a ceramic hybrid or stainless steel.

As shown most clearly in FIG. 5, the rotor 48 includes two blade assemblies 51. Each blade assembly 51 comprises two interconnected, diametrically opposite blades 50a and 50b, each of which is configured to slide within a corresponding slot in the rotor 48. Each blade assembly 51 also includes two cam follower bearings 52a and 52b. As the rotor 48 rotates within the housing 40, a cam 46 which is fixedly mounted on the shaft 44 engages the cam follower bearings 52a, 52b and forces the blade assemblies 51 to reciprocate in the rotor slots.

Figure 10:
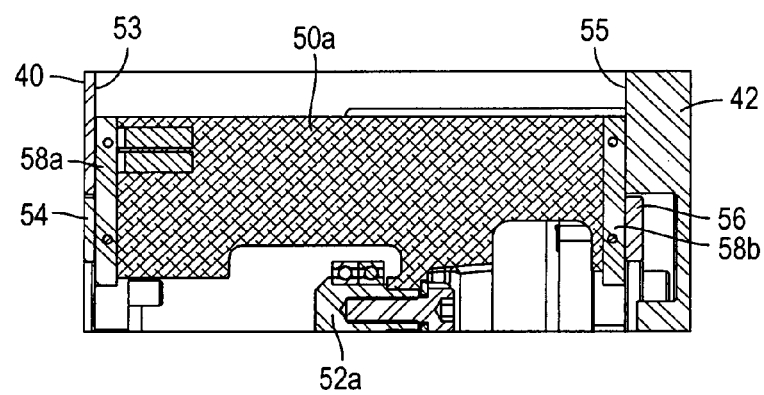
FIG. 10 is an enlarged cross sectional view of the portion of the fluid meter designated "C" in FIG. 4 showing an embodiment of the blade component of the meter.

As shown most clearly in FIGS. 4 and 10, each of the blades 50a, 50b is laterally restrained between a first inside surface portion 53 of the housing 40 and a second inside surface portion 55 of the cover 42 and between a first retaining ring 54 which is mounted in the housing radially inwardly of the first inside surface portion and a second retaining ring 56 which is mounted in the cover radially inwardly of the second inside surface portion. This arrangement prevents the blades 50a, 50b from cocking when the meter mounting orientation is changed. As a result, the meter factor is not affected by the orientation of the meter. Also, plastic wear strips 58a and 58b may be attached to the lateral ends of each of the blades 50a, 50b to protect the blades against abrasion.

Referring again to FIG. 5, the meter also includes a measurement element 72 which is mounted against the inside wall of the housing 40. The space between the measurement element 72 and the rotor 48 defines the measuring chamber of the meter. The position of the measuring element 72 may be adjusted via an adjustment screw 78 which is accessed via a plug 80. The meter also includes a block 70 which is mounted against the inside wall of the housing 40 opposite the measurement element 72. The position of the block 70 may be adjusted via an adjustment screw 74 which is accessed via plug 76.

Referring again to FIG. 6, the cover 42 may be provided with two temperature probe bosses 120 in which temperature sensing elements, such as resistant temperature devices (RTD's), may be installed. One temperature probe boss 120 may be used by the customer to monitor the temperature of the metered fluid, thereby eliminating the need to install a separate temperature sensing device in the pipeline to which the meter is connected. The other probe boss 120 may be used by Weights and Measures authorities to validate the first temperature measurement device. The cover 42 may also be provided with drain plugs 130 to allow the fluid to be drained from the meter in either a horizontal or vertical orientation, thereby providing ease of installation for the user.

Referring to FIGS. 7 and 8, the components of the rotational measurement system of the present invention are housed in a chamber 43 which is formed in the cover 42 and is closed by an explosion proof cap 110. The rotation measurement system, generally 90, includes a generally cylindrical first magnet 92 which is connected to the end portion 49 of the rotor 48. The first magnet 92 extends through an opening 91 in the cover 42 which is connected to the chamber 43. A generally tubular cap member 96 is positioned over the first magnet 92 and is secured and sealed to the cover 42 over the opening 91. The cap member 96, which is preferably made of a non-ferrous material, is a pressure containing member which prevents fluid in the cavity 41 from entering the chamber 43.

The first magnet 92 is magnetically coupled to a second magnet 94 which is positioned on the opposite side of the cap member 96. The second magnet includes a generally cylindrical base portion 95 which is positioned concentrically over the first magnet 92 and a shaft 97 which extends axially from the base portion. The shaft 97 is rotatably supported in a bearing 88 which is mounted to a support member 98 that is secured to the cover 42 over the cap member 96.

Due to the coupling between the magnetic field generated by the first magnet 92 and the magnetic field generated by the second magnet 94, rotation of the first magnet causes the second magnet to rotate. Thus, rotation of the rotor 48 is transmitted magnetically through the cap member 96 from the first magnet 92 to the second magnet 94. As a result, the process fluid remains isolated in the cavity 41 and cannot leak into the chamber 93.

Rotation of the second magnet 94, and thus the rotor 48, is detected by a suitable encoder, such as an integrated circuit magnetic rotary encoder 102. The rotary encoder 102 detects the incremental angular turns of the distal end of the axial extension 97 or, more preferably, a third magnet 100 which is disposed on the distal end of the axial extension. The rotary encoder 102, which may be either programmable or non-programmable, outputs a specified number of electronic pulses per rotation of the axial extension 97 or the third magnet 100. These pulses are then be processed by a microprocessor to calculate fluid flow through the meter.

As an alternative, the rotary encoder 102 may also be programmed to generate output pulses which are based on the absolute angular position of the axial extension 97 or the third magnet 100. In addition, the microprocessor could be programmed to provide linearization of the meter rotational performance to extend the usable flow rate range of the meter from, e.g., 10:1 to 50:1, consistent with global legal metrology Weights and Measurement requirements.

Thus, it may be seen that the meter of the present invention provides many advantages over prior art meters. The meter includes an integrated electronics housing (i.e., the chamber 43) which reduces the overall size and weight of the meter and eliminates the cost of separate housings. This is especially beneficial for meters which are mounted on delivery tanker vehicles. The meter also has an integral explosion-proof cover design that encloses the electronics and any other physical sensing elements that may be desired, such as temperature probes and pressure sensors.

Additionally, the meter of the present invention employs a captive blade design that allows the meter to operate in multiple physical mounting positions without affecting the meter factor output. In other words, the physical mount does not degrade meter performance. For example, the captive blades allow for high measurement accuracy even when the meter is mounted on a delivery tanker truck and the truck is parked on an incline. The captive blade design also allows customers to mount the meter in the orientation that best fits their applications. In addition, plastic wear strips on the blade end surfaces provide an abrasion resistant surface. The captive blades and plastic wear strips allow the meter to be operated with the live shaft in a horizontal or off-plane (angled from the horizontal plane) orientation without affecting either the metrological accuracy or the repeatability of the meter.

Furthermore, the meter of the present invention comprises adjustable measuring elements (i.e., the block 70 and the measurement element 72) which allow adjustment of the meter tolerances during assembly in order to accommodate less restrictive manufacturing tolerances than are typically employed on positive displacement meters. The adjustable measuring elements also simplify meter assembly and maintenance.

Thus, the meter of the present invention may be produced in a cost effective manner and yet maintain the accuracy required for fluid custody transfer. Microprocessor technology combined with the unique use of an angular position sensing integrated circuit allows the effective range of the meter to be extended from that typically provided by mechanical measuring devices. Additionally, the meter measurement chamber is designed to support use of the meter in high pressure applications that previously could normally not be achieved with prior art single housing meters, thus eliminating the need for a dual housing design to keep the measuring element pressure stabilized.

Also, the meter of the present invention uses a magnetic coupling to transmit rotation of the rotor to a measurement system located outside of the meter housing. This eliminates the need to penetrate the pressure containing parts of the meter in order to transmit rotor rotation, thus eliminating the risk that volatile organic compounds will escape into the atmosphere through, e.g., a packing gland. The magnetic coupling also eliminates the gear train that prior art meters commonly use to transmit rotor rotation, thus reducing the part count and cost of the meter.

Additionally, the three-bearing ceramic hybrid and/or stainless steel bearing shaft support system allows for free rotation of the rotor 48 over an extended performance turndown ration of 50:1 or greater, thus allowing for repeatable performance across a wide metrological measurement range.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A fluid meter which includes:
    a housing which comprises a cavity that defines a flow bore through which a fluid to be metered is directed;
    a rotor which is rotatably supported in the cavity and is set into rotation by the fluid flowing through the flow bore;
    a cover which is secured to the housing over the cavity to thereby contain the fluid in the flow bore, the cover comprising are opening in axial alignment with the rotor;
    a first magnet which is connected to an axial end portion of the rotor adjacent the opening;
    a second magnet which is positioned adjacent the opening and is magnetically coupled to the first magnet;
    a cap member which is positioned between the first and second magnets and is secured to the cover over the opening to thereby isolate the second magnet from the fluid in the flow bore; and
    a rotary encoder which is operatively coupled to the second magnet;
    wherein rotation of the rotor is magnetically transmitted through the cap member from the first magnet to the second magnet and is detected by the rotary encoder.

2. The fluid meter of claim 1, wherein the rotary encoder comprises a magnetic rotary encoder.

3. The fluid meter of claim 2, wherein the rotary encoder comprises an integrated circuit magnetic rotary encoder.

4. The fluid meter of claim 1, wherein the cover comprises a chamber within which the second magnet and the rotary encoder are positioned.

5. The fluid meter of claim 4, wherein the chamber is dosed by an explosion proof cap.

6. The fluid meter of claim 4, wherein the axial end portion of the rotor is rotatably supported in a bearing which is mounted to the cover.

7. The fluid meter of claim 4, wherein the cap member separates the flow bore from the chamber.

8. The fluid meter of claim 7, wherein the cap member comprises a generally tubular configuration and the first magnet extends through the opening and into the cap member.

9. The fluid meter of claim 8, wherein the second magnet comprises a generally cylindrical base portion which is positioned coaxially over the cap member.

10. The fluid meter of claim 9, wherein the second magnet comprises a shaft which extends axially from the base portion towards the rotary encoder.

11. The fluid meter of claim 10, wherein the shaft is rotatably supported in a bearing which is mounted to a support member that is secured to the cover over the cap member.

12. The fluid meter of claim 10, wherein the rotary encoder comprises an integrated circuit magnetic rotary encoder which magnetically detects the rotation of the distal end of the shaft.

13. The fluid meter of claim 10, wherein the rotary encoder comprises an integrated circuit magnetic rotary encoder which magnetically detects the rotation of a third magnet which is disposed on the distal end of the shaft.

14. A fluid meter which comprises:
    a housing which includes a cavity that defines bore through which a fluid to be metered is directed;
    a rotor which is rotatably supported in the cavity and is set into rotation by the fluid flowing through the flow bore:
    a cover which is secured to the housing over the cavity to thereby contain the fluid in the flow bore;
    wherein the rotor comprises a number of blade assemblies, each of which includes two interconnected, diametrically opposite blades; and
    wherein each blade is laterally restrained between a first inside surface portion of the housing and a second inside surface portion of the cover and between a first retaining ring which is mounted in the housing radially inwardly of the first inside surface portion and a second retaining ring which is mounted in the cover radially inwardly of the second inside surface portion.

15. The fluid meter of claim 14, wherein plastic wear strips are mounted to the lateral ends of each of the blades.

16. A fluid meter which comprises:
    a housing which includes a cavity that defines a flow bore through which a fluid to be metered is directed;
    a rotor which is rotatably supported in the cavity and is set into rotation by the fluid flowing through the flow bore; and
    a measurement element which is mounted in the cavity on one side of the rotor; and
    a block element which is mounted in the cavity on the diametrically opposite side of the rotor;
    wherein at least one of the measurement element and the block element is adjustably connected to the housing.

17. The fluid meter of claim 16, wherein the measurement element is adjustably connected to the housing.

18. The fluid meter of claim 16, wherein the block element is adjustably connected to the housing.

19. A fluid meter which comprises:
    a housing which includes a cavity that defines a flow bore through which a fluid to be metered is directed;
    a rotor which is rotatably supported in the cavity and is set into rotation by the fluid flowing through the flow bore;
    a first magnet which is operatively coupled to the rotor such that rotation of the rotor causes a corresponding rotation of the first magnet; and
    a magnetic rotary encoder which is positioned adjacent the first magnet and is configured to generate a signal representative of the absolute angular position of the first magnet and thus the rotor.

20. The fluid meter of claim 19, further comprising:
    a cover which is secured to the housing over the cavity to thereby contain the fluid in the flow bore, the cover comprising an opening in axial alignment with the rotor;
    a second magnet which is connected to an axial end portion of the rotor adjacent the opening;
    wherein the first magnet is positioned adjacent he opening and is magnetically coupled to the second magnet; and
    a cap member which is positioned between the first and second magnets and is secured to the cover over the opening to thereby isolate the first magnet from the fluid in the flow bore;
    wherein rotation of the rotor is magnetically transmitted through the cap member from the second magnet to the first magnet.

21. The fluid meter of claim 19, further comprising:
    a cover which is secured to the housing over the cavity to thereby contain the fluid in the flow bore, the cover comprising an opening in axial alignment with the rotor;
    a second magnet which is connected to an axial end portion of the rotor adjacent the opening;
    a third magnet which is positioned adjacent the opening and is magnetically coupled to the second magnet;
    a cap member which is positioned between the second and third magnets and is secured to the cover over the opening to thereby isolate the third magnet from the fluid in the flow bore;
    wherein rotation of the rotor is magnetically transmitted through the cap member from the second magnet to the third magnet;

wherein the third magnet comprises a shaft which extends axially towards the rotary encoder; and wherein the first magnet is disposed on the distal end of the shaft.

22. The fluid meter of claim 21, wherein the cap member comprises a generally tubular configuration and the second magnet extends through the opening and into the cap member.

23. The fluid meter of claim 22, wherein the third magnet comprises a generally cylindrical base portion which is positioned coaxially over the cap member and from which the shaft extends.

* * * * *